(12) United States Patent
Vaillant

(10) Patent No.: US 7,259,198 B2
(45) Date of Patent: Aug. 21, 2007

(54) ULTRAVIOLET RADIATION STABILIZED POLYOLEFINS

(75) Inventor: Daniel Vaillant, Saint-Nicolas de la Haie (FR)

(73) Assignee: ExxonMobil Chemical Patents Inc., Houston, TX (US)

( * ) Notice: Subject to any disclaimer, the term of this patent is extended or adjusted under 35 U.S.C. 154(b) by 264 days.

(21) Appl. No.: 10/458,825

(22) Filed: Jun. 11, 2003

(65) Prior Publication Data

US 2004/0024095 A1    Feb. 5, 2004

Related U.S. Application Data

(60) Provisional application No. 60/396,662, filed on Jul. 18, 2002.

(51) Int. Cl.
*C08K 5/34* (2006.01)

(52) U.S. Cl. ............... 524/99; 524/102; 524/103; 524/245

(58) Field of Classification Search .......... 524/99, 524/102, 103, 245
See application file for complete search history.

(56) References Cited

U.S. PATENT DOCUMENTS

| | | | |
|---|---|---|---|
| 3,349,059 A | 10/1967 | Lappin | 260/45.85 |
| 3,716,328 A | 2/1973 | Mayer | 8/165 |
| 4,692,486 A | 9/1987 | Gugumus | 524/100 |
| 4,708,979 A | 11/1987 | Pedrazzetti et al. | 524/249 |
| 4,764,428 A | 8/1988 | Gloyer | |
| 4,774,275 A | 9/1988 | Hisano et al. | 524/370 |
| 5,023,286 A | 6/1991 | Abe et al. | 524/128 |
| 5,132,344 A | 7/1992 | Matteodo | 524/100 |
| 5,376,716 A | 12/1994 | Nayak et al. | 524/295 |
| 5,455,289 A | 10/1995 | Caselli | 523/223 |
| 5,596,033 A | 1/1997 | Horsey et al. | 524/100 |
| 5,877,260 A | 3/1999 | Roth et al. | 525/101 |
| 5,922,471 A | 7/1999 | Chatterjee | 428/461 |
| 6,013,723 A | 1/2000 | Akao | 524/577 |
| 6,066,695 A | 5/2000 | Roth et al. | 525/101 |
| 6,231,936 B1 | 5/2001 | Kozimor et al. | 428/34.7 |
| 6,284,822 B1 | 9/2001 | Tamura et al. | 524/108 |
| 6,329,465 B1 | 12/2001 | Takahashi et al. | 525/191 |
| 6,723,769 B2 * | 4/2004 | Miller et al. | 524/236 |

FOREIGN PATENT DOCUMENTS

| | | |
|---|---|---|
| EP | 0 080 431 B1 | 6/1983 |
| EP | 0 341 925 B1 | 11/1989 |
| EP | 0 487 077 | 5/1992 |
| EP | 0 565 073 | 10/1993 |
| EP | 0 310 393 | 1/1995 |
| EP | 0 984 037 A1 | 3/2000 |
| GB | 1 352 347 | 5/1974 |
| JP | 62-273239 | 11/1987 |
| JP | 2001-200069 | 7/2001 |
| WO | WO9002770 | 3/1990 |
| WO | WO9902495 | 1/1999 |
| WO | 01/62840 | 8/2001 |

OTHER PUBLICATIONS

Plastics Additives 438-439 (Geoffrey Pritchard ed., Chapman & Hall, London 1998).
EP0080431 Abstract, Jun. 01, 1983.
EP0984037 Abstract, Mar. 08, 2000.
JP 02049042 Abstract, Feb. 19, 1990.
JP 07138434 Abstract, May 30, 1995.
JP 62-273239 Abstract, Nov. 27, 1987.
JP 02049042 Abstract, Feb. 19, 1990, Inorganic Compound-Filled Polyolefin Composition and Heat and Light Stabilizers for Their Preparation, Fukui et al.
CN 1277237 Abstract, Dec. 20, 2000, Antistatic Weather-Resistant Polypropylene Compositions for Air Conditioner Parts.

* cited by examiner

*Primary Examiner*—Peter D. Mucahy

(57) ABSTRACT

The present invention provides polyolefin compositions that are UV stable and suitable for articles that may be exposed to sunlight. The present invention provides, in one aspect, a polyolefin homopolymer or copolymer comprising, by weight of the polyolefin: (a) from 0.001 to 2 wt % hindered amine; (b) from 0.001 to 1 wt % ethoxylated amine; and (c) from 0.001 to 1 wt phenolic antioxidant; wherein the amount of phenolic antioxidant (PA), ethoxylated amine (EA) and hindered amine (HA) present in the composition is satisfied by the equation:

$$\frac{PA + EA}{HA} = Q$$

wherein Q ranges from 0.15 to 250 when each component is expressed as a weight percentage. The composition is stable towards UV radiation such that it is useful for any number of articles such as automotive components and other articles that are, for example, injection molded.

41 Claims, No Drawings

ULTRAVIOLET RADIATION STABILIZED POLYOLEFINS

CROSS REFERENCE TO RELATED APPLICATIONS

This application claims the benefit of Provisional Application No. 60/396,662, filed Jul. 18, 2002, herein incorporated by reference.

FIELD OF THE INVENTION

The present invention relates to polyolefin compositions having improved ultraviolet (UV) radiation stability. More particular, the present invention relates to polypropylene homopolymer and copolymer compositions including a synergistic combination of stabilizers suitable for such articles as automotive components.

BACKGROUND OF THE INVENTION

For the production of polyolefins, the trend is to use mass polymerization processes instead of solution processes. With a mass polymerization process, there is little or no cleaning or "deashing" of the final polymer, thus substantial amounts of catalyst residue are left in the polymer. This is especially the case in the production of polypropylene by the so called SPHERIPOL process, where the polymer is typically deashed only with water. While this process is adequate for homopolymers due to the high porosity of the polymer grains, it is inadequate for copolymers of polypropylene where the polymer is no longer porous due to the rubber phase filling in the cavities of the resin. Thus, in the case of many polypropylene resins, especially copolymers of polypropylene, there is a significant catalyst residue left in the polymer.

Catalyst resides left behind in polyolefin materials are a problem given that, among other reasons, the catalysts are often activated by light. This light activation causes the breakdown of the polymer and results in a loss of properties and discoloration. While there have been some disclosures of using stabilizing compounds such as hindered amines or phenolic compounds to stabilize polymers against UV degradation, such measures are often inadequate. For further background, see, U.S. Pat. Nos. 6,329,465 B1; 6,284,822; 6,231,936 B1; 6,013,723; 5,877,260; 5,455,289; 5,132,344; 4,708,979; 4,692,486; EP 0 984 037 A1; EP 0 341 925 B1; and JP2001-200069. In fact, it is known that some antioxidants such as phenolic antioxidants act antagonistically, or unfavorably, with other additives such as, for example, hindered amine additives. (See, e.g., PLASTICS ADDITIVES 438-439 (Geoffrey Pritchard ed., Chapman & Hall 1998).

What is needed is a polyolefin composition that is UV radiation stable such that it is suitable for articles of manufacture exposed to light, such as automotive parts. While ethoxylated amines have been used as antistatic agents, such as disclosed in, for example, U.S. Pat. No. 5,455,289, and in PLASTICS ADDITIVES 112 (1998), the present invention is directed to the surprising discovery that ethoxylated amines act synergistically with other stabilizing agents to improve the UV stability of polyolefin compositions.

SUMMARY OF THE INVENTION

The present invention provides, in one aspect, a polyolefin homopolymer or copolymer comprising, by weight of the polyolefin: (a) from 0.001 to 2 wt % of hindered amine; (b) from 0.001 to 1 wt % of ethoxylated amine; and (c) from 0.001 to 1 wt % of phenolic antioxidant; wherein the amount of phenolic antioxidant (PA), ethoxylated amine (EA) and hindered amine (HA) present in the composition is satisfied by the equation:

$$\frac{PA + EA}{HA} = Q$$

wherein Q ranges from 0.15 to 250 when each component is expressed as a weight percentage. The composition can be used in any number of articles such as automotive components and other articles that demand UV stability.

DETAILED DESCRIPTION OF THE INVENTION

As used herein, the term "alkyl" refers to a paraffinic hydrocarbon group which may be derived from an alkane by dropping one or more hydrogens from the formula, such as, for example, a methyl group, or $CH_3^-$, or an ethyl group, $CH_3CH_2^-$, etc.

As used herein, the term "alkenyl" refers to a unsaturated paraffinic hydrocarbon group which may be derived from an alkane by dropping one or more hydrogens from the formula, such as, for example, an ethenyl group, $CH_2=CH^-$, and a propenyl group, or $CH_3CH=CH^-$, etc.

As used herein, the term "aryl" refers to a hydrocarbon group that forms a ring structure characteristic of aromatic compounds such as, for example, benzene, naphthalene, phenanthrene, anthracene, etc., and typically possess alternate double bonding ("unsaturation") within its structure. An aryl group is thus a group derived from an aromatic compound by dropping one or more hydrogens from the formula such as, for example, phenyl, or $C_6H_5^-$.

By "substituted", it is meant substitution of at least one hydrogen group by at least one substituent selected from, for example, halogen (chlorine, bromine, fluorine, or iodine), amino, nitro, sulfoxy (sulfonate or alkyl sulfonate), thiol, alkylthiol, and hydroxy; alkyl, straight or branched chain having 1 to 20 carbon atoms which includes methyl, ethyl, propyl, tert-butyl, isopropyl, isobutyl, etc.; alkoxy, straight or branched chain alkoxy having 1 to 20 carbon atoms, and includes, for example, methoxy, ethoxy, propoxy, isopropoxy, butoxy, isobutoxy, secondary butoxy, tertiary butoxy, pentyloxy, isopentyloxy, hexyloxy, heptryloxy, octyloxy, nonyloxy, and decyloxy; haloalkyl, which means straight or branched chain alkyl having 1 to 20 carbon atoms which is substituted by at least one halogen, and includes, for example, chloromethyl, bromomethyl, fluoromethyl, iodomethyl, 2-chloroethyl, 2-bromoethyl, 2-fluoroethyl, 3-chloropropyl, 3-bromopropyl, 3-fluoropropyl, 4-chlorobutyl, 4-fluorobutyl, dichloromethyl, dibromomethyl, difluoromethyl, diiodomethyl, 2,2-dichloroethyl, 2,2-dibromomethyl, 2,2-difluoroethyl, 3,3-dichloropropyl, 3,3-difluoropropyl, 4,4-dichlorobutyl, 4,4-difluorobutyl, trichloromethyl, 4,4-difluorobutyl, trichloromethyl, trifluoromethyl, 2,2,2-trifluoroethyl, 2,3,3-trifluoropropyl, 1,1,2,2-tetrafluoroethyl, and 2,2,3,3-tetrafluoropropyl. Thus, for example, an example of a "substituted triazine" would include 1-amino-1,1,3,3-tetramethylbutane triazine (1,1,3,3-tetramethylbutyl imine triazine), etc.

The present invention is directed to polyolefin compositions having improved UV radiation stability. By "UV radiation", it is meant radiation between the wavelengths of 100 Å to 3900 Å, preferably from 2900 Å and 3900 Å, this later range being the wavelength range received on the surface of the earth. Such desirable articles include automotive parts, appliance parts, sporting equipment, and other articles that are exposed to sunlight and thus require UV resistance and stability. This is achieved in the present invention using a synergistic combination of additives, including at least the presence of hindered amines, ethoxylated amines, and phenolic antioxidants in the polyolefin composition.

In one aspect of the invention, the polyolefin is a homopolymer or copolymer of polypropylene. The copolymer can be a random copolymer, a block copolymer, an impact copolymer, a plastomer, or other polymer comprising at least 40 wt % propylene derived units. The method of making the polypropylene is not critical, as it can be made by slurry, solution, or gas phase processes, and by using either Ziegler-Natta-type catalysts, metallocene-type catalysts, or a combination thereof. Such catalysts are well known in the art, and are described in, for example, ZIEGLER CATALYSTS (Gerhard Fink, Rolf Mulhaupt and Hans H. Brintzinger, eds., Springer-Verlag 1995); Resconi et al., *Selectivity in Propene Polymerization with Metallocene Catalysts*, 100 CHEM. REV. 1253-1345 (2000); and I, II METALLOCENE-BASED POLYOLEFINS (Wiley & Sons 2000).

In one embodiment of the invention, the polyolefin is a copolymer, either random, block, or impact copolymer, of propylene derived units and ethylene or $C_4$ to $C_{10}$ α-olefin derived units. The ethylene or $C_4$ to $C_{10}$ α-olefin derived units are present from 0.1 wt % to 35 wt % of the copolymer in one embodiment, and from 4 to 20 wt % in another embodiment. In another embodiment of the invention, the polypropylene is a copolymer of propylene derived units and from 0.5 wt % to 25 wt % of ethylene or $C_4$ to $C_{10}$ α-olefin derived units, and from 2 wt % to 20 wt % of the ethylene or $C_4$ to $C_{10}$ α-olefin derived units in another embodiment, wherein a desirable copolymer comprises ethylene or $C_4$ to $C_{10}$ α-olefin derived units in any combination of any upper wt % limit with any lower wt % limit described herein.

In one embodiment of the invention, the polyolefin suitable for the composition excludes physical blends of polypropylene with other polyolefins, and in particular, excludes physical blends of polypropylene with polyethylene or polyethylene copolymers, meaning that, polyethylene or polyethylene copolymers are not purposefully added in any amount to the polyolefin (e.g., polypropylene homopolymer or copolymer) compositions of the invention.

In another embodiment of the invention, the polyolefin is a homopolymer of polypropylene. In another embodiment, the polypropylene has a molecular weight distribution (Mw/Mn) ranging from 2 to 10, and from 2.2 to 5 in another embodiment, and from 2.2 to 4 in yet another embodiment. In yet another embodiment, the 1% secant flexural modulus of the polypropylene ranges from 10 MPa to 500 MPa, and from 20 MPa to 400 MPa in yet another embodiment.

Typically, polyolefins such as polypropylene are stripped (washed or "deashed") after polymerization using some solvent such as alcohol. This involves contacting the polypropylene, typically a solid powder or small pellets, with a stream of the solvent in one or more steps. The stream of solvent may be in a counter-flow to the polyolefin in one embodiment. In one aspect of the present invention, the polyolefin is washed exclusively in water in a single step. In another aspect of the invention, the polyolefin is not washed.

After stripping, the polyolefin is blended with additives to stabilize the resin and articles made therefrom against UV radiation. The additives may be combined with the polyolefin resin by any suitable means such as by a Banbury blender, a Brabender blender, single or multiple screw extruder, or other type of extruder. The temperature of the resin is controlled such that the resin, while in its melt form, is maintained at temperatures that will not destroy the effectiveness of the additives. For example, a desirable temperature range is from 100° C. to 300° C. in one embodiment, and from 120° C. to 280° C. in another embodiment, and from 100° C. to 200° C. in yet another embodiment.

The stabilizing additives of the polyolefin compositions of the invention are added to such a degree as to achieve the desired level of UV stability as measured using the analytical techniques described herein. In one embodiment of the invention, a polyolefin homopolymer or copolymer results comprising, by weight of the polyolefin, (a) from 0.001 to 2 wt % of hindered amine; (b) from 0.001 to 2 wt % of ethoxylated amine; and (c) from 0.001 to 2 wt % of phenolic antioxidant.

The synergistic combination of hindered amine (HA), phenolic antioxidant (PA) and ethoxylated amine (EA) can be expressed by the following relationship:

$$\frac{HA + PA}{EA} = Q$$

wherein Q ranges from 0.15 to 250 in one embodiment, and from 0.30 to 150 in another embodiment, and from 0.40 to 50 in yet another embodiment, and from 0.50 to 30 in yet another embodiment, when PA, EA and HA are expressed as weight percentages of the various components, based on the total weight of the polyolefin composition.

As used herein, reference to "hindered amine compounds", "hindered amines", "ethoxylated amine compounds", "ethoxylated amines", "phenolic antioxidant compounds" and "phenolic antioxidants" is meant to include all forms of these compounds, either liquid, solid, free base, metal salt, halide salt, etc. Further, use of these terms in conjunction with specific compounds is not meant to exclude reasonably associated derivatives thereof, such as, for example, alkylated ($C_1$ to $C_{10}$), halogenated, hydroxylated or carboxylated forms of such compounds, substitutions by piperidine, substituted piperidine, triazine and substituted triazine moieties, and polymers of such compounds with varying numbers of repeating units.

Hindered amines suitable for the polyolefin compositions of the present invention include low molecular weight and high molecular weight polyalkylpiperidines, such as disclosed in, for example, U.S. Pat. No. 4,692,486 and U.S. Pat. No. 5,596,033 and hindered piperidine compounds such as described in PLASTICS ADDITIVES 435-438 (1998). Thus, in one embodiment of the invention, the hindered amine compound is selected from low molecular weight polyalkylpiperidines, high molecular weight polyalkylpiperidines, hindered piperidine compounds, and mixtures thereof. The "low" molecular weight polyalkylpiperidines include compounds having a weight average molecular weight in the range from 100 to 1200, while the "high" molecular weight polyalkylpiperidines include compounds having a weight average molecular weight in the range from 1200 to 40,000. In another embodiment the hindered amines are selected from compounds having the following structures (I), and their derivatives:

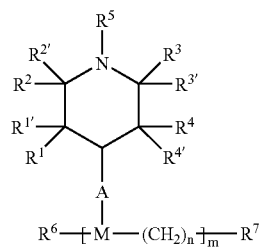
(I)

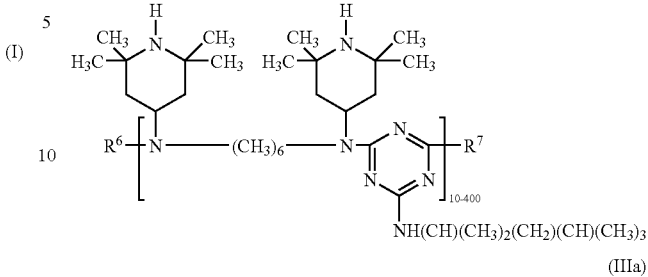
(IIb)

wherein M is silicon, alkoxysilane, nitrogen, or phosphorous; the value of n ranges from 1 to 50, and the value of m ranges from 1 to 400; $R^1$, $R^{2'}$, $R^2$, $R^{2'}$, $R^3$, $R^{3'}$, $R^4$, and $R^{4'}$ are independently selected from hydrogen, $C_1$ to $C_{20}$ alkyls, and $C_3$ to $C_{30}$ branched alkyls; $R^5$ is selected from hydrogen, $C_1$ to $C_{20}$ alkyls, and $C_3$ to $C_{30}$ branched alkyls; $R^6$ and $R^7$ are independently selected from hydrogen, $C_1$ to $C_{20}$ alkyls, and $C_3$ to $C_{30}$ branched alkyls, 1,3,4-triazine and substituted 1,3,4-triazines; and wherein A may be a direct bonding interaction with nitrogen or a group selected from $C_1$ to $C_{20}$ alkyls, and $C_3$ to $C_{30}$ branched alkyls, $C_1$ to $C_{20}$ alkoxys, imidazole and its derivatives. Described another way, "A" may represent, for example, a covalent bond between the piperidine ring and the M group as indicated in (I).

Hindered amines suitable in the present invention may comprise compounds represented by structure (I) above, and any derivatives of structure (I) above. Non-limiting examples of such hindered amine compounds encompassed by (I) are selected from the following compounds and their derivatives: poly(N-β-hydroxymethyl-2,2,6,6-tetramethyl-4-hydroxy-piperidyl succinate), bis(1,2,2,6,6-pentamethyl-4-piperidyl)sebacate, bis(2,2,6,6-tetramethyl-4-piperidyl) sebacate, poly [2-N,N'-di(2,2,6,6-tetramethyl-4-piperidinyl)-hexanediamine-4-(1-amino-1,1,3,3-tetramethylbutane)sym-triazine],polymethylpropyl-3-oxy [4-(2,2,6,6-tetramethyl-piperidinyl]siloxane, tetrakis (1,2,2, 6,6-pentamethyl-4-piperidyl) 1,2,3,4-butanetetracarboxylate, 1,6-hexanediamine-N,N'-bis(2,2,6, 6-tetramethyl)-4-piperidinyl)-, polymers with 2,4-dichloro-6-(4-morpholinyl)-1,3,5-triazine, N,N'-bis(1,2,2,6,6-pentamethyl-4-piperidinyl)-1,6-hexanediamine, morpholine-2,4,6-trichloro-1,3,5-triazine, esters of 2,2,6,6-tetramethyl-4-piperidinol and mixtures thereof.

So, for example, hindered amines such as described by structures (IIa), (IIb), (IIIa) and (IIIb) are encompassed by structure (I) are not meant to excluded therefrom:

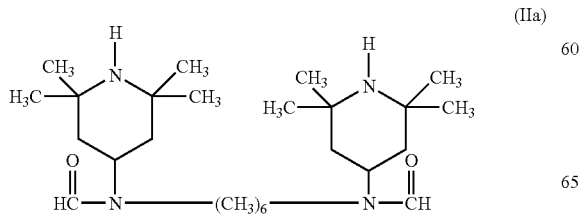
(IIa)

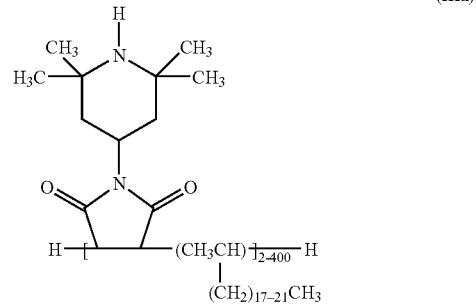
(IIIa)

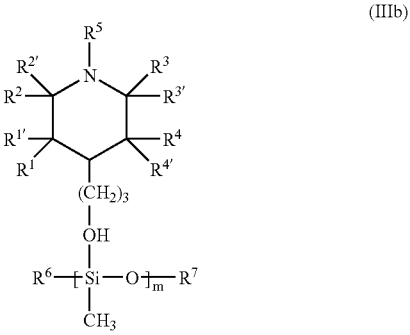
(IIIb)

Compositions of the invention also include one or more phenolic antioxidants. This includes so called "hindered" phenols and substituted phenols such as disclosed in, for example, PLASTICS ADDITIVES 73-79 (1998) and in U.S. Pat. No. 6,284,822. The one or more phenolic antioxidant compounds are selected from structures represented by the following structures (IV), (V) and (VI):

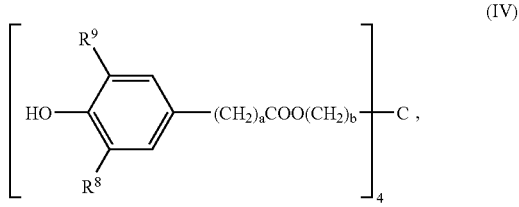
(IV)

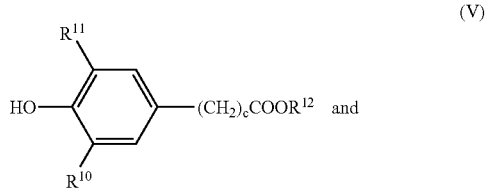
(V)

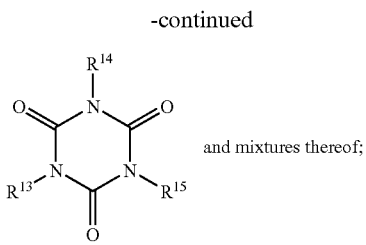

(VI)

and mixtures thereof;

wherein the values of a, b and c independently range from 1 to 10, and wherein $R^8$, $R^9$, $R^{10}$ $R^{11}$, and $R^{12}$ are selected from hydrogen, $C_1$ to $C_{10}$ alkyls and $C_3$ to $C_{30}$ branched alkyls; and wherein $R^{13}$, $R^{14}$ and $R^{15}$ are selected from moieties represented by the following structures (VII) and (VIII):

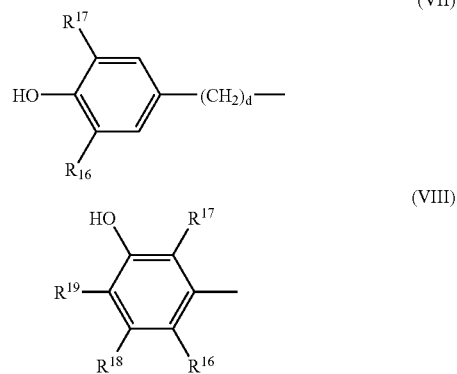

(VII)

(VIII)

wherein the value of d ranges from 1 to 10, and wherein $R^{16}$, $R^{17}$, $R^{18}$, and $R^{19}$ are independently selected from hydrogen, $C_1$ to $C_{10}$ alkyls and $C_3$ to $C_{30}$ branched alkyls.

In a desirable embodiment, $R^8$, $R^9$, $R^{10}$, $R^{11}$, $R^{16}$ and $R^{17}$ are independently selected from methyl, ethyl, propyl, isopropyl, butyl and tertiary butyl moieties.

In one embodiment, the phenolic antioxidant is selected from compound (VI) structures, wherein $R^{13}$, $R^{14}$ and $R^{15}$ are as defined above. Compounds included by structure (VI) include 1,3,5-triazine-2,4,6(1H,3H,5H)-trione,1,3,5-tris{[3,5-bis-(1,1-dimethylethyl)-4-hydroxyphenyl]methyl} and its derivatives.

The phenolic antioxidant suitable in the present invention may comprise compounds represented by structures (IV), (V), and (VI) above, and any derivatives of structures (IV), (V), and (VI). Non-limiting examples of suitable phenolic antioxidant compounds encompassed by the structures (IV), (V), and (VI) are selected from the following compounds and their derivatives: 2,6-di-tert-butyl-4-methylphenol; 2,4-di-tert-butyl-phenol, pentaerythrityl tetrakis(3,5-di-tert-butyl-4-hydroxyphenyl)propionate, octadecyl-3-(3',5'-di-tert-butyl-4'-hydroxyphenyl)propionate, tetrakis[methylene(3,5-di-tert-butyl-4-hydroxycinnamate)]methane; bis-2,2'-methylene-bis(6-tert-butyl-4-methylphenol)terephthalate; 1,3,5-trimethyl-2,4,6-tris(3,5-di-tert-butyl-4-hydroxybenzyl)benzene; tris(3,5-di-tert-butyl-4-hydroxybenzyl)isocyanurate; 1,3,5-tris(4-tert-butyl-3-hydroxy-2,6-dimethylbenzyl)1,3,5-triazine-2,4,6-(1H,3H,5H)-trione; 1,1,3-tris(2-methyl-4-hydroxy-5-tert-butylphenyl)butane, 1,3,5-triazine-2,4,6(1H,3H,5H)-trione, 1,3,5-tris[[3,5-bis-(1,1-dimethylethyl)-4-hydroxyphenyl]methyl], 4,4',4"-[(2,4,6-trimethyl-1,3,5-benzenetriyl)tris-(methylene)]tris[2,6-bis(1,1-dimethylethyl)], 6-tert-butyl-3-methylphenyl and its derivatives; 2,6-di-tert-butyl-p-cresol; 2,2'-methylenebis(4-ethyl-6-tert-butylphenol); 4,4'-butylidenebis(6-tert-butyl-m-cresol); 4,4'-thiobis(6-tert-butyl-m-cresol); 4,4'-dihydroxy-diphenylcyclohexane; alkylated bisphenol; styrenated phenol; 2,6-di-tert-butyl-4-methylphenol; n-octadecyl-3-(3',5'-di-tert-butyl-4'-hydroxyphenyl)propionate; 2,2'-methylenebis(4-methyl-6-tert-butylphenol); 4,4'-thiobis(3-methyl-6-tert-butylphenyl); 4,4'-butylidenebis(3-methyl-6-tert-butylphenol); stearyl-β-(3,5-di-tert-butyl-4-hydroxyphenyl)propionate; 1,1,3-tris(2-methyl-4-hydroxy-5-tert-butylphenyl)butane; 1,3,5-trimethyl-2,4,6-tris(3,5-di-tert-butyl-4-hydroxybenzyl)benzene; tetrakis[methylene-3-(3',5'-di-tert-butyl-4'-hydroxyphenyl)propionate]methane, stearyl 3,5-di-tert-butyl-4-hydroxyhydocinnamate and mixtures thereof.

The ethoxylated amine compound is selected from structures represented by structure (IX) below:

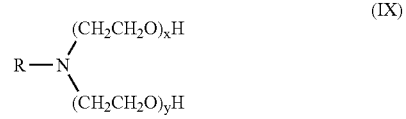

(IX)

wherein R is a $C_2$ to $C_{30}$ alkyl or branched alkyl in one embodiment, and a $C_8$ to $C_{20}$ alkyl or branched alkyl in another embodiment; and wherein x and y are the same or different and have a value of from 2 to 20 in one embodiment, and from 2 to 15 in another embodiment. Non-limiting examples of such compounds include the following compounds and their derivatives: N,N-Bis(2-hydroxyethyl)alkylamine, Coco bis(2-hydroxyethyl)amine, bis-(2-hydroxyethyl)isodecyloxypropylamine, poly(5)oxyethylene isodecyloxypropylamine, bis-(2-hydroxyethyl) isotridecyloxypropylamine, poly(5)oxyethylene isotridecyloxypropyl amine, bis-(2-hydroxyethyl) linear alkyloxypropylamine, bis(2-hydroxyethyl) soya amine, poly(5) oxyethylene octadecylamine, poly(5) oxyethylene tallow amine, poly(3)oxyethylene 1,3 diaminopropane, bis-(2-hydroxyethyl) isodecyloxypropylamine, bis-(2-hydroxyethyl) linear alkyloxypropylamine, poly (5) oxyethylene octadecylamine, bis-(2-hydroxyethyl) tallow amine, poly(3)oxyethylene 1,3 diaminopropane, and mixtures thereof.

The one or more hindered amine compounds is present in the composition from 0.001 wt % to 2.0 wt % in one embodiment, and from 0.02 wt % to 1.5 wt % in another embodiment, and from 0.1 wt % to 1.0 wt % in yet another embodiment, and from 0.2 wt % to 0.8 wt % in yet another embodiment, wherein a desirable range may include any upper wt % limit with any lower wt % limit described herein. The one or more phenolic antioxidants is present in the composition from 0.001 wt % to 2.0 wt % in one embodiment, and from 0.02 wt % to 0.1 wt % in another embodiment, and from 0.05 wt % to 0.5 wt % in yet another embodiment, wherein a desirable range may include any upper wt % limit with any lower wt % limit described herein. The one or more ethoxylated amine compounds is present in the composition from 0.001 wt % to 2.0 wt % in one embodiment, and from 0.02 wt % to 0.1 wt % in another embodiment, and from 0.1 wt % to 0.8 wt % in yet another embodiment, and from 0.2 wt % to 0.5 wt % in yet another embodiment, wherein a desirable range may include any upper wt % limit with any lower wt % limit described herein.

The polyolefin compositions of the present invention may also contain other additives. Those additives include plasticizers, nucleating agents, acid scavengers, stabilizers, anti-corrosion agents, other UV absorbers such as chain-breaking antioxidants, etc., quenchers, antistatic agents, slip agents, pigments, dyes and fillers. Dyes and other colorants common in the industry may be present from 0.01 to 10 wt % in one embodiment, and from 0.1 to 6 wt % in another embodiment.

In particular, organic phosphites may also be present in the polyolefin compositions of the invention from 0.001 to 1 wt % in one embodiment, and from 0.01 to 0.8 wt % in another embodiment, and from 0.02 to 0.5 wt % in yet another embodiment. Non-limiting examples of organic phosphites that are suitable are tris(2,4-di-tert-butylphenyl) phosphite (IRGAFOS 168) and di(2,4-di-tert-butylphenyl) pentaerithritol diphosphite (ULTRANOX 626).

More particularly, fillers may be present from 0.1 to 50 wt % in one embodiment, and from 0.1 to 3 wt % of the composition in another embodiment, and from 0.2 to 1 wt % in yet another embodiment. Desirable fillers include titanium dioxide, silicon carbide, antimony oxide, lead carbonate, zinc white, lithopone, zircon, corundum, spinel, apatite, Barytes powder, barium sulfate, magnesiter, carbon black, dolomite, calcium carbonate, talc and hydrotalcite compounds of the ions Mg, Ca, or Zn with Al, Cr or Fe and $CO_3$ and/or $HPO_4$, hydrated or not; quartz powder, hydrochloric magnesium carbonate, glass fibers, clays, alumina, and other metal oxides and carbonates, and blends thereof.

Fatty acid salts may also be present in the polyolefin compositions of the present invention. Such salts may be present from 0.001 to 1 wt % of the composition in one embodiment, and from 0.01 to 0.8 wt % in another embodiment. Examples of fatty acid metal salts include lauric acid, stearic acid, succinic acid, stearyl lactic acid, lactic acid, phthalic acid, benzoic acid, hydroxystearic acid, ricinoleic acid, naphthenic acid, oleic acid, palmitic acid, and erucic acid, suitable metals including Li, Na, Mg, Ca, Sr, Ba, Zn, Cd, Al, Sn, Pb and so forth. Preferable fatty acid salts are selected from magnesium stearate, calcium stearate, sodium stearate, zinc stearate, calcium oleate, zinc oleate, and magnesium oleate.

The components of the polyolefinic composition of the present invention are desirably melt blended by any suitable means. In one aspect of the invention, the components are blended in an extruder. The resultant resin is suitable for forming into articles of manufacture by any suitable means such as by blow molding, injection molding, thermoforming, extrusion or co-extrusion, cast molding, rotational molding, or other forms of forming the resin. More particularly, with respect to the physical process of producing the blend, sufficient mixing should take place to assure that a uniform blend will be produced prior to conversion into a finished product.

Thus, in the cases of injection molding of various articles, simple solid state blends of the pellets serve equally as well as pelletized melt state blends of raw polymer granules, of granules with pellets, or of pellets of the two components since the forming process includes a remelting and mixing of the raw material. In the process of compression molding of medical devices, however, little mixing of the melt components occurs, and a pelletized melt blend would be preferred over simple solid state blends of the constituent pellets and/or granules. Those skilled in the art will be able to determine the appropriate procedure for blending of the polymers to balance the need for intimate mixing of the component ingredients with the desire for process economy.

The polyolefinic compositions of the present invention are suitable for such articles as automotive components, wire and cable jacketing, pipes, agricultural films, geomembranes, toys, sporting equipment, medical devices, casting and blowing of packaging films, extrusion of tubing and profiles, sporting equipment, outdoor furniture (e.g., garden furniture) and playground equipment, boat and water craft components, and other such articles. In particular, the compositions are suitable for automotive components such as bumpers, grills, trim parts, dashboards and instrument panels, exterior door and hood components, spoiler, wind screen, hub caps, mirror housing, body panel, protective side molding, and other interior and external components associated with automobiles, trucks, boats, and other vehicles.

Other useful articles and goods may be formed economically by the practice of our invention including: crates, containers, packaging, labware, such as roller bottles for culture growth and media bottles, instrumentation sample holders and sample windows; liquid storage containers such as bags, pouches, and bottles for storage and IV infusion of blood or solutions; packaging material including those for any medical device or drugs including unit-dose or other blister or bubble pack as well as for wrapping or containing food preserved by irradiation. Other useful items include medical tubing and valves for any medical device including infusion kits, catheters, and respiratory therapy, as well as packaging materials for medical devices or food which is irradiated including trays, as well as stored liquid, particularly water, milk, or juice, containers including unit servings and bulk storage containers as well as transfer means such as tubing, pipes, and such.

These devices may be made or formed by any useful forming means for forming polyolefins. This will include, at least, molding including compression molding, injection molding, blow molding, and transfer molding; film blowing or casting; extrusion, and thermoforming; as well as by lamination, pultrusion, protrusion, draw reduction, rotational molding, spinbonding, melt spinning, melt blowing; or combinations thereof. Use of at least thermoforming or film applications allows for the possibility of and derivation of benefits from uniaxial or biaxial orientation of the radiation tolerant material.

One aspect of the present invention can be described as a polyolefin homopolymer or copolymer composition comprising hindered amines; ethoxylated amines; and phenolic antioxidants; wherein the evaluation value, or "evaluation" of the composition after 2500 hrs. in a WOM Ci35A at 80° C. is from 4 to 5. The components of the composition are thus present at levels to achieve the desirable evaluation values for a given end use article. The components can be blended by any suitable means, such as, for example, an extruder.

In one embodiment, the components are present, by weight of the composition, as follows: from 0.001 to 2 wt % hindered amines; from 0.001 to 1 wt % ethoxylated amines; and from 0.001 to 1 wt % phenolic antioxidants. In another embodiment, the hindered amine is present from 0.02 wt % to 1 wt %. In yet another embodiment, the phenolic antioxidant is present from 0.02 wt % to 0.8 wt %. And in yet another embodiment, the ethoxylated amine is present from 0.02 wt % to 0.8 wt %.

Further, the identity of the components can be selected from any number of compounds in order to achieve the desirable UV stability. In one embodiment, the hindered amine compound is selected from low molecular weight polyalkylpiperidines, high molecular weight polyalkylpiperidines, hindered piperidine compounds, and mixtures thereof.

In another embodiment, the hindered amine compound is selected from compounds having the following structures:

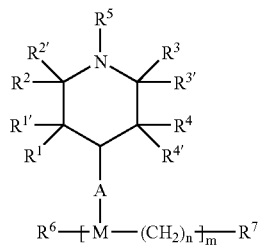

wherein M is silicon, alkoxysilane, nitrogen, or phosphorous; and wherein the value of n ranges from 1 to 50, and the value of m ranges from 1 to 400; wherein $R^1$, $R^{2'}$, $R^2$, $R^{2'}$, $R^3$, $R^{3'}$, $R^4$, and $R^{4'}$ are selected independently from hydrogen, $C_1$ to $C_{20}$ alkyls, and $C_3$ to $C_{30}$ branched alkyls; $R^5$ is selected from hydrogen, $C_1$ to $C_{20}$ alkyls, and $C_3$ to $C_{30}$ branched alkyls; and polymeric pyridine derivatives; and $R^6$ and $R^7$ are selected independently from hydrogen, $C_1$ to $C_{20}$ alkyls, and $C_3$ to $C_{30}$ branched alkyls, 1,3,4-triazine and substituted 1,3,4-triazines; and wherein A may directly bond with nitrogen or a group selected from $C_1$ to $C_{20}$ alkyls, $C_1$ to $C_{20}$ alkoxys, and $C_3$ to $C_{30}$ branched alkyls, imidazole and its derivatives.

In yet another embodiment, the hindered amine is selected from the following structures:

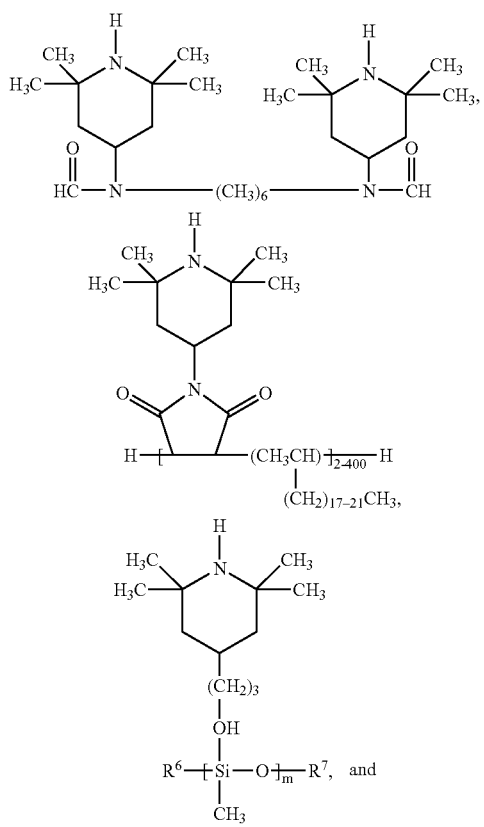

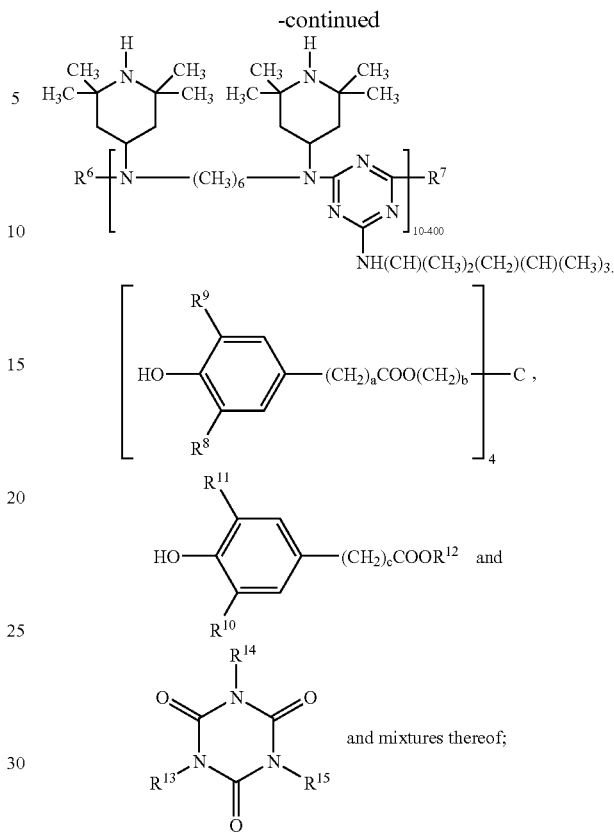

In one another embodiment, the phenolic antioxidant is selected from structures represented by the following:

wherein the values of a, b and c independently range from 1 to 10, and wherein $R^8$, $R^9$, $R^{10}$ $R^{11}$, and $R^{12}$ are independently selected from hydrogen, $C_1$ to $C_{10}$ alkyls and $C_3$ to $C_{30}$ branched alkyls; and wherein $R^{13}$, $R^{14}$ and $R^{15}$ are independently selected from structured represented by the following:

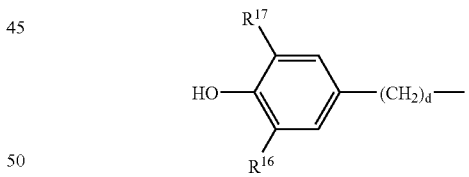

wherein the value of d ranges from 1 to 10, and wherein $R^{16}$ and $R^{17}$ are independently selected from hydrogen $C_1$ to $C_{10}$ alkyls and $C_3$ to $C_{30}$ branched alkyls.

In another embodiment, the phenolic antioxidant is selected from:

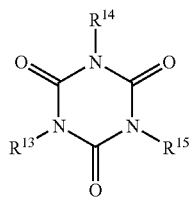

wherein R$^{13}$, R$^{14}$ and R$^{15}$ are independently selected from structured represented by the following:

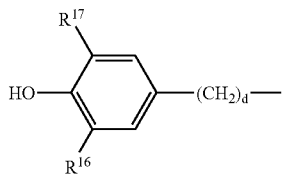

wherein the value of d ranges from 1 to 10, and wherein R$^{16}$ and R$^{17}$ are independently selected from hydrogen C$_1$ to C$_{10}$ alkyls and C$_3$ to C$_{30}$ branched alkyls.

Non-limiting examples of suitable phenolic antioxidants are 2,6-di-tert-butyl-4-methylphenol; 2,4-di-tert-butyl-phenol, pentaerythrityl tetrakis(3,5-di-tert-butyl-4-hydroxyphenyl) propionate, octadecyl-3-(3',5'-di-tert-butyl-4'-hydroxyphenyl)propionate, tetrakis[methylene(3,5-di-tert-butyl-4-hydroxycinnamate)]methane; bis-2,2'-methylene-bis(6-tert-butyl-4-methylphenol)terephthalate; 1,3,5-trimethyl-2,4,6-tris(3,5-di-tert-butyl-4-hydroxybenzyl)benzene; tris(3,5-di-tert-butyl-4-hydroxybenzyl)isocyanurate; tris(3,5-di-tert-butyl-4-hydroxybenzyl) isocyanurate, tris(4-tert-butyl-3-hydroxy-2,6-dimethyl benzyl)isocyanurate, 1,3,5-tris(4-tert-butyl-3-hydroxy-2,6-dimethylbenzyl)1,3,5-triazine-2,4,6-(1H,3H,5H)-trione; 1,1,3-tris(2-methyl-4-hydroxy-5-tert-butylphenyl)butane, 1,3,5-triazine-2,4,6(1H,3H,5H)-trione, 1,3,5-tris[[3,5-bis-(1,1-dimethylethyl)-4-hydroxyphenyl]methyl],4,4',4"-[(2,4,6-trimethyl-1,3,5-benzenetriyl)tris-(methylene)]tris[2,6-bis(1,1-dimethylethyl)], stearyl 3,5-di-tert-butyl-4-hydroxyhydocinnamate and mixtures thereof.

The compositions of the invention may further comprise other components such as organic phosphites, fillers, and coloring agents or dyes.

In one embodiment, the polyolefin is copolymer of propylene derived units and ethylene derived units. In one embodiment, the ethylene derived units in the copolymer are present from 0.5 wt % to 25 wt % of the copolymer, and from 10 wt % to 20 wt % in another embodiment.

In another embodiment, the polyolefin is a homopolymer of propylene derived units.

In any case, the polyolefin is deashed with water in a single step in one embodiment.

Thus, the compositions of the present invention can be described alternately by any of the embodiments disclosed herein.

For example, the invention relates to:

A. a composition comprising (by weight of the composition):
(a) a polyolefin homopolymer or copolymer;
(b) from 0.001 to 2 wt % hindered amine;
(c) from 0.001 to 1 wt % ethoxylated amine; and
(d) from 0.001 to 1 wt % phenolic antioxidant; wherein the amount of phenolic antioxidant (PA), ethoxylated amine (EA) and hindered amine (HA) present in the composition is satisfied by the equation:

$$\frac{PA + EA}{HA} = Q$$

wherein Q ranges from 0.15 to 250 when each component is expressed as a weight percentage by weight of the total composition.

B. The composition of A, wherein the hindered amine is selected from low molecular weight polyalkylpiperidines, high molecular weight polyalkylpiperidines, hindered piperidine compounds, and mixtures thereof.

C. The composition A-B, wherein the hindered amine is selected from compounds having the following structures:

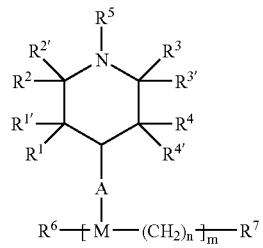

wherein M is silicon, alkoxysilane, nitrogen, or phosphorous; wherein the value of n ranges from 1 to 50, and the value of m ranges from 1 to 400;

wherein R$^1$, R$^{2'}$, R$^2$, R$^{2'}$, R$^3$, R$^{3'}$, R$^4$, and R$^{4'}$ are selected independently from hydrogen, C$_1$ to C$_{20}$ alkyls, and C$_3$ to C$_{30}$ branched alkyls; R$^5$ is selected from hydrogen, C$_1$ to C$_{20}$ alkyls, and C$_3$ to C$_{30}$ branched alkyls; and polymeric pyridine derivatives; and R$^6$ and R$^7$ are selected independently from hydrogen, C$_1$ to C$_{20}$ alkyls, and C$_3$ to C$_{30}$ branched alkyls, 1,3,4-triazine and substituted 1,3,4-triazines; and wherein A may directly bond with nitrogen or a group selected from C$_1$ to C$_{20}$ alkyls, C$_1$ to C$_{20}$ alkoxys, and C$_3$ to C$_{30}$ branched alkyls, imidazole and its derivatives.

D. The composition of A-C, wherein the ethoxylated amine is selected from structures represented by:

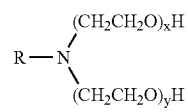

wherein R is a C$_2$ to C$_{30}$ alkyl or branched alkyl in one embodiment, and a C$_8$ to C$_{20}$ alkyl or branched alkyl in another embodiment; and wherein x and y are the same or different and have a value of from 2 to 20.

E. The composition of A-D, wherein the phenolic antioxidant is selected from structures represented by the following:

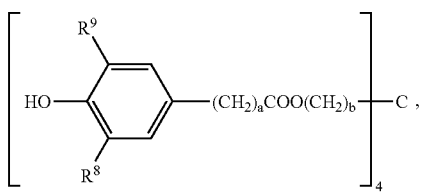

-continued

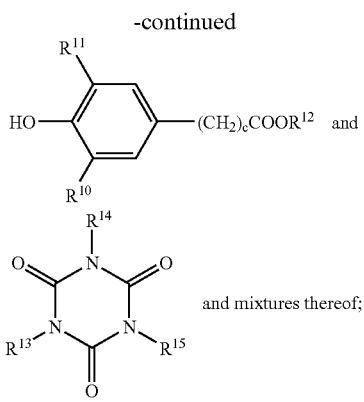

and mixtures thereof;

wherein the values of a, b and c independently range from 1 to 10, and
wherein $R^8$, $R^9$, $R^{10}$ $R^{11}$, and $R^{12}$ are independently selected from hydrogen, $C_1$ to $C_{10}$ alkyls and $C_3$ to $C_{30}$ branched alkyls; and wherein $R^{13}$, $R^{14}$ and $R^{15}$ are independently selected from structured represented by the following:

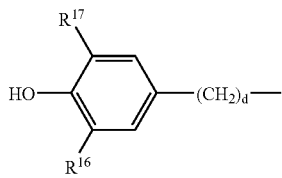

wherein the value of d ranges from 1 to 10, and wherein $R^{16}$ and $R^{17}$ are independently selected from hydrogen $C_1$ to $C_{10}$ alkyls and $C_3$ to $C_{30}$ branched alkyls.

F. The composition of A-E, wherein the value of Q ranges from 0.30 to 150.

G. The composition of A-E, wherein the value of Q ranges from 0.40 to 50.

H. The composition of A-E, wherein the value of Q ranges from 0.50 to 30.

I. The composition of A-H, wherein the hindered amine is selected from the following compounds and their derivatives: poly(N-β-hydroxymethyl-2,2,6,6-tetramethyl-4-hydroxy-piperidyl succinate), bis(1,2,2,6,6-pentamethyl-4-piperidyl)sebacate, bis(2,2,6,6-tetramethyl-4-piperidyl) sebacate, poly{[6-(1,1,3,3-tetramethylbutyl)-imine]-1,3,5-triazine-2,4-diol][2-(2,2,6,6-tetramethylpiperidyl)amine] hexamethylene-[4-(2,2,6,6-tetramethylpiperidyl)imine}, polymethylpropyl-3-oxy[4-(2,2,6,6-tetramethyl-piperidinyl]siloxane, tetrakis(1,2,2,6,6-pentamethyl-4-piperidyl) 1,2,3,4-butanetetracarboxylate, 1,6-hexanediamine-N,N'-bis (2,2,6,6-tetramethyl)-4-piperidinyl)-, polymers of 2,4-dichloro-6-(4-morpholinyl)-1,3,5-triazine, N,N'-bis(1,2,2,6, 6-pentamethyl-4-piperidinyl)-1,6-hexanediamine, morpholine-2,4,6-trichloro-1,3,5-triazine, esters of 2,2,6,6-tetramethyl-4-piperidinol and mixtures thereof.

J. The composition of A-I, wherein the phenolic antioxidant is selected from the following compounds and their derivatives: 2,6-di-tert-butyl-4-methylphenol; 2,4-di-tert-butyl-phenol, pentaerythrityl tetrakis(3,5-di-tert-butyl-4-hydroxyphenyl) propionate, octadecyl-3-(3',5'-di-tert-butyl-4'-hydroxyphenyl)propionate, tetrakis[methylene(3,5-di-tert-butyl-4-hydroxycinnamate)]methane; bis-2,2'-methylene-bis(6-tert-butyl-4-methylphenol)terephthalate; 1,3,5-trimethyl-2,4,6-tris(3,5-di-tert-butyl-4-hydroxybenzyl) benzene; tris(3,5-di-tert-butyl-4-hydroxybenzyl) isocyanurate; tris(3,5-di-tert-butyl-4-hydroxybenzyl) isocyanurate, tris(4-tert-butyl-3-hydroxy-2,6-dimethyl benzyl)isocyanurate, 1,3,5-tris(4-tert-butyl-3-hydroxy-2,6-dimethylbenzyl)1,3,5-triazine-2,4,6-(1H,3H,5H)-trione; 1,1,3-tris(2-methyl-4-hydroxy-5-tert-butylphenyl)butane, 1,3,5-triazine-2,4,6(1H,3H,5H)-trione, 1,3,5-tris[[3,5-bis-(1,1-dimethylethyl)-4-hydroxyphenyl]methyl], 4,4',4"-[(2,4, 6-trimethyl-1,3,5-benzenetriyl)tris-(methylene)]tris[2,6-bis (1,1-dimethylethyl)], stearyl 3,5-di-tert-butyl-4-hydroxyhydocinnamate and mixtures thereof.

K. The composition of A-J, wherein the phenolic antioxidant is present in the composition from 0.05 wt % to 0.5 wt %.

L. The composition of A-K, wherein the hindered amine is present in the composition from 0.2 wt % to 0.8 wt %.

M. The composition of A-L, wherein the ethoxylated amine is present in the composition from 0.1 wt % to 0.8 wt %.

N. The composition of A-M, wherein the composition further comprises an organic phosphite.

O. The composition of A-N, wherein the composition further comprises a filler.

P. The composition of A-O, wherein the polyolefin copolymer is a copolymer of propylene derived units and ethylene derived units.

Q. The composition of P, wherein the ethylene is present from 0.5 wt % to 25 wt % of the polyolefin copolymer.

R. The composition of A-O, wherein the polyolefin homopolymer is a homopolymer of propylene derived units.

S. The composition of A-R, wherein the polyolefin homopolymer or copolymer is deashed in a single step with water.

T. The composition of A-S, wherein the evaluation of the composition after 2500 hrs. in a WOM Ci35A at 80° C. is from 4 to 5.

U. An automotive component made from any of A-T.

EXAMPLES

The present invention, while not meant to be limiting by, may be better understood by reference to the following example and Tables.

The components of the present invention are blended as follows. The components are weighed and mixed together in a HENSCHEL blender; then, the homogeneous mixtures are formed into pellets using a twin-screw extruder ZSK53 from WERNER. The screw speed is 250 rpm and the extruder is operated at a temperature of about 240° C.

Examples 1 and 2 are extruder blends (Werner ZSK53) of a copolymer of metallocene catalyzed polypropylene (17 wt % ethylene copolymer) that has been deashed (stripped) using water in a single step. The polymerization is performed in a SPHERIPOL-type plant. The first stage of the reaction section is a liquid loop reactor, which produces homopolymers in a medium of liquid propylene monomer. Mixing is provided by circulation of the liquid monomer. Polymer suspended in liquid propylene is discharged from the base of the loop reactor and transferred to a flash drum.

The second phase of the reaction section is a gas-phase reactor for copolymer production; in this gas-phase unit, heterophasic copolymers are produced by allowing an elastomeric (ethylene-propylene rubber) copolymer matrix to grow within a homopolymer matrix. The polymer is then discharged to a steamer.

This resulting polymers is used in different compositions described herein. They contain various components as outlined in Table 1, and the weight percentages as in the Table 2. The components are weighed and mixed together in a HENSCHEL mixer; then, the homogeneous mixtures are formed into pellets using a twin-screw extruder ZSK53 from WERNER. The screw speed is 250 rpm and the extruder is operated at a temperature of about 240° C. 3 mm thick plaques, which were prepared from the pellets using a BATTENFELD injection molding machine, were used to study the aging. These samples were UV tested according to the method of RENAULT (D27 1911) and PSA (D27 1289) with a WOM Ci35A from ATLAS at 80° C. on the black panel. This method is conformed to ISO 4892-2-methods of exposure to laboratory light sources part 2: xenon-arc sources. A 3500W xenon-arc with borosilicate S filters was used to simulate the spectral power distribution of daylight; the irradiation was 0.55 W/m$^2$ at 340 nm; the temperature was 80° C. measured with a plastic black panel thermometer; the relative humidity was fixed at 50±5%; the cycle of water exposure is 102 min. without spray then 18 min. with demineralised water spray. 3 mm thick plaques of 68 mm×46 mm are exposed in the chamber.

The evaluation values, or "evaluation", as shown in Table 2, is a visual one by comparison with a standard gray scale as described in ISO 4582. The standard gray scale used (English grey scale reference 99-0006-00) is conformed to the norm ISO 105 A02. A product is acceptable if the gray scale remains above 4; the maximum is 5. These samples show the benefits of using an ethoxylated amine component, wherein the sample with the ethoxylated amine, Example 2, shows an evaluation of 4-5 compared to Example 1, which has an evaluation of 3.

Examples 3 and 4 were prepared as in Examples 1 and 2. The compositions and evaluation results are in Table 3.

These samples show how the presence of different phenolic resins can influence the discoloration. In particular, the ALVINOX FB antioxidant an evaluation of from 4 to 5, which is an improvement over the IRGANOX 1010 antioxidant. Thus, in a desirable embodiment of the invention, the phenolic antioxidant is selected from compounds comprising a triazine or substituted triazine.

Examples 5 through 15 were prepared the same as the samples above. These Examples show further variations of the invention.

The polyolefin compositions of the invention have improved UV stability as demonstrated by the evaluation of test components. In one embodiment of the polyolefin of the invention, the evaluation after 2500 hrs. is from 4 to 5. In another embodiment of the compositions of the invention, the evaluation after 3500 hrs. is from 4 to 5. This stability is maintained even after the polymer composition has been subjected to high processing temperatures such as from −50° C. to 350° C. in one embodiment, and from 60° C. to 280° C. in another embodiment, and from 60° C. to 240° C. in yet another embodiment and from 70° C. to 180° C. in yet another embodiment.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the scope of the present invention. Further, certain features of the present invention are described in terms of a set of numerical upper limits and a set of numerical lower limits. It should be appreciated that ranges formed by any combination of these limits are within the scope of the invention unless otherwise indicated.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

TABLE 1

List of Components

| component | No. | chemical name | tradename/source |
|---|---|---|---|
| polypropylene copolymer | — | poly(propylene-co-ethylene); 17 wt % ethylene, Ziegler-Natta catalyzed. | ExxonMobil Chemical Company (Houston, TX) |
| OP[1] | 1 | tris(2,4-di-tert-butylphenyl)phosphite | IRGAFOS 168/Ciba |
| PA[2] | 2 | pentaerythrityl tetrakis(3,5-di-tert-butyl-4-hydroxyphenyl)propionate | IRGANOX 1010/Ciba |
| PA | 3 | 1,3,5-Tri(3,5-di-tert-butyl-4-hydroxybenzyl-isocyanurate | ALVINOX FB/Sigma (IRGANOX 3114/Ciba) |
| HA[3] | 4 | poly[2-N,N'-di(2,2,6,6-tetramethyl-4-piperidinyl)-hexanediamine-4-(1-amino-1,1,3,3-tetramethylbutane)sym-triazine] | CHIMASORB 944/Ciba |
| HA | 5 | bis(1,2,2,6,6-pentamethyl-4-piperidyl)sebacate | TINUVIN 770/Ciba |
| EA[4] | 6 | N,N-bis(2-hydroxyethyl)alkylamine | ATMER 163/II |
| EA | 7 | Masterbatch with 30 to 50% ATMER 163 | ATMER 7000/ICI |

[1]"Organic Phosphite".
[2]"Phenolic Antioxidant" Component.
[3]"Hindered Amine" Component.
[4]"Ethoxylated Amine" Component.

TABLE 2

Examples 1 and 2.

| component (wt %) | Example 1 | Example 2 |
|---|---|---|
| PP copolymer | 95.5 | 95.3 |
| OP1 | 0.1 | 0.1 |
| PA2 | 0.05 | 0.05 |
| HA4 | 0.3 | 0.3 |
| HA5 | 0.45 | 0.45 |
| EA6 | — | 0.2 |
| calcium stearate | 0.1 | 0.1 |
| fine talc | 0.5 | 0.5 |
| gray masterbatch | 3 | 3 |
| evaluation after 2500 hrs. | 3 | 4-5 |

TABLE 3

Examples 3 and 4.

| component (wt %) | Example 3 | Example 4 |
|---|---|---|
| PP copolymer | 95.1 | 95.1 |
| OP1 | 0.1 | 0.1 |
| PA2 | 0.05 | — |
| PA3 | — | 0.05 |
| HA4 | 0.3 | 0.3 |
| HA5 | 0.45 | 0.45 |
| EA7 | 0.4 | 0.4 |
| zinc stearate | 0.1 | 0.1 |
| fine talc | 0.5 | 0.5 |
| gray masterbatch evaluation after | 3 | 3 |
| 2500 hrs | 3-4 | 4-5 |
| 3500 hrs | 2 | |

TABLE 4

Examples 5 through 15.

| component (wt %) | E5 | E6 | E7 | E8 | E9 | E10 | E11 | E12 | E13 | E14 | E15 |
|---|---|---|---|---|---|---|---|---|---|---|---|
| PP copolymer | 95.287 | 95.075 | 95.075 | 94.863 | 95.375 | 95.075 | 95.375 | 95.075 | 95.3 | 95 | 95.15 |
| OP1 | 0.1 | 0.1 | 0.1 | 0.1 | 0.1 | 0.1 | 0.1 | 0.1 | 0.1 | 0.1 | 0.1 |
| PA3 | 0.440 | 0.256 | 0.044 | 0.256 | — | 0.3 | 0.15 | 0.15 | 0.15 | 0.15 | 0.15 |
| HA4 | 0.225 | 0.225 | 0.225 | 0.225 | 0.075 | 0.075 | 0.075 | 0.075 | — | 0.3 | 0.15 |
| HA5 | 0.344 | 0.344 | 0.556 | 0.556 | 0.45 | 0.45 | 0.3 | 0.6 | 0.45 | 0.45 | 0.45 |
| EA7 | 0.4 | 0.4 | 0.4 | 0.4 | 0.4 | 0.4 | 0.4 | 0.4 | 0.4 | 0.4 | 0.4 |
| zinc stearate | 0.1 | 0.1 | 0.1 | 0.1 | 0.1 | 0.1 | 0.1 | 0.1 | 0.1 | 0.1 | 0.1 |
| fine talc | 0.5 | 0.5 | 0.5 | 0.5 | 0.5 | 0.5 | 0.5 | 0.5 | 0.5 | 0.5 | 0.5 |
| gray masterbatch evaluation after: | 3 | 3 | 3 | 3 | 3 | 3 | 3 | 3 | 3 | 3 | 3 |
| 2500 hrs | 4 | 4-5 | 4-5 | 4-5 | 3 | 4-5 | 4-5 | 4-5 | 4-5 | 4-5 | 4-5 |
| 3000 hrs | 3 | 4-5 | 4 | 4-5 | 1-2 | 4-5 | 4-5 | 4-5 | 4-5 | 4 | 4-5 |
| 3500 hrs | 1-2 | 4 | 3 | 4-5 | 1-2 | 4-5 | 4 | 3-4 | 3-4 | 3-4 | 4-5 |
| 4000 hrs | 1-2 | 3 | 1-2 | 3 | 1-2 | 2-3 | 2-3 | 2 | 2 | 2 | 2 |

I claim:

1. A composition comprising (by weight of the composition):
   (a) a polyolefin homopolymer or copolymer;
   (b) from 0.001 to 2 wt % hindered amine;
   (c) from 0.2 to 1 wt % ethoxylated amine; and
   (d) from 0.001 to 1 wt % phenolic antioxidant; wherein the amount of phenolic antioxidant (PA), ethoxylated amine (EA) and hindered amine (HA) present in the composition is satisfied by the equation:

$$\frac{PA + EA}{HA} = Q$$

wherein Q ranges from 0.3 to 250 when each component is expressed as a weight percentage by weight of the total composition.

2. The composition of claim 1, wherein the hindered amine is selected from low molecular weight polyalkylpiperidines, high molecular weight polyalkylpiperidines, hindered piperidine compounds, and mixtures thereof.

3. The composition of claim 1, wherein the hindered amine is selected from compounds having the following structures:

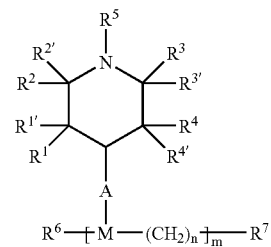

wherein M is silicon, alkoxysilane, nitrogen, or phosphorous; wherein the value of n ranges from 1 to 50, and the value of m ranges from 1 to 400; wherein $R^1$, $R^{2'}$, $R^2$, $R^{2'}$, $R^3$, $R^{3'}$, $R^4$, and $R^{4'}$ are selected independently from hydrogen, $C_1$ to $C_{20}$ alkyls, and $C_3$ to $C_{30}$ branched alkyls; $R^5$ is selected from hydrogen, $C_1$ to $C_{20}$ alkyls, and $C_3$ to $C_{30}$ branched alkyls; and polymeric pyridine derivatives; and $R^6$ and $R^7$ are selected independently from hydrogen, $C_1$ to $C_{20}$ alkyls, and $C_3$ to $C_{30}$ branched alkyls, 1,3,4-triazine and substituted 1,3,4-triazines; and wherein A may directly bond with nitrogen or a group selected from $C_1$ to $C_{20}$ alkyls, $C_1$ to $C_{20}$ alkoxys, and $C_3$ to $C_{30}$ branched alkyls, imidazole and its derivatives.

4. The composition of claim 1, wherein the ethoxylated amine is selected from structures represented by:

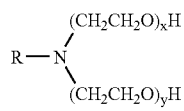

wherein R is a $C_2$ to $C_{30}$ alkyl or branched alkyl; wherein x and y are the same or different and have a value of from 2 to 20.

5. The composition of claim 1, wherein the phenolic antioxidant is selected from structures represented by the following:

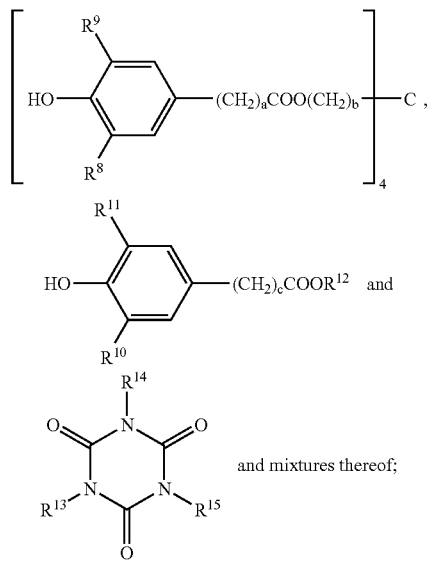

and mixtures thereof;

wherein the values of a, b and c independently range from 1 to 10, and wherein $R^8$, $R^9$, $R^{10}$ $R^{11}$, and $R^{12}$ are independently selected from hydrogen, $C_1$ to $C_{10}$ alkyls and $C_3$ to $C_{30}$ branched alkyls; and wherein $R^{13}$, $R^{14}$ and $R^{15}$ are independently selected from structured represented by the following:

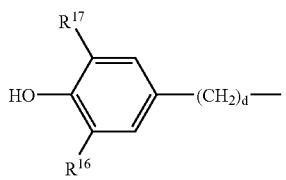

wherein the value of d ranges from 1 to 10, and wherein $R^{16}$ and $R^{17}$ are independently selected from hydrogen $C_1$ to $C_{10}$ alkyls and $C_3$ to $C_{30}$ branched alkyls.

6. The composition of claim 1, wherein the value of Q ranges from 0.30 to 150.

7. The composition of claim 1, wherein the value of Q ranges from 0.40 to 50.

8. The composition of claim 1, wherein the value of Q ranges from 0.50 to 30.

9. The composition of claim 1, wherein the hindered amine is selected from the following compounds and their derivatives: poly(N-β-hydroxymethyl-2,2,6,6-tetramethyl-4-hydroxy-piperidyl succinate), bis(1,2,2,6,6-pentamethyl-4-piperidyl)sebacate, bis(2,2,6,6-tetramethyl-4-piperidyl) sebacate, poly{[6-(1,1,3,3-tetramethylbutyl)-imine]-1,3,5-triazine-2,4-diol][2-(2,2,6,6-tetramethylpiperidyl)amine] hexamethylene-[4-(2,2,6,6-tetramethylpiperidyl)imine}, polymethylpropyl-3-oxy[4-(2,2,6,6-tetramethyl-piperidi-nyl]siloxane, tetrakis (1,2,2,6,6-pentamethyl-4-piperidyl) 1,2,3,4-butanetetracarboxylate, 1,6-hexanediamine-N,N'-bis (2,2,6,6-tetramethyl)-4-piperidinyl)-, polymers of 2,4-dichloro-6-(4-morpholinyl)-1,3,5-triazine, N,N'-bis(1,2,2,6,6-pentamethyl-4-piperidinyl)-1,6-hexanediamine, morpholine-2,4,6-trichloro-1,3,5-triazine, esters of 2,2,6,6-tetramethyl-4-piperidinol and mixtures thereof.

10. The composition of claim 1, wherein the phenolic antioxidant is selected from the following compounds and their derivatives: 2,6-di-tert-butyl-4-methylphenol; 2,4-di-tert-butyl-phenol, pentaerythrityl tetrakis(3,5-di-tert-butyl-4-hydroxyphenyl) propionate, octadecyl-3-(3',5'-di-tert-butyl-4'-hydroxyphenyl)propionate, tetrakis[methylene(3,5-di-tert-butyl-4-hydroxycinnamate)]methane; bis-2,2'-methylene-bis(6-tert-butyl-4-methylphenol)terephthalate; 1,3,5-trimethyl-2,4,6-tris(3,5-di-tert-butyl-4-hydroxybenzyl)benzene; tris(3,5-di-tert-butyl-4-hydroxybenzyl)isocyanurate; tris(3,5-di-tert-butyl-4-hydroxybenzyl)isocyanurate, tris(4-tert-butyl-3-hydroxy-2,6-dimethyl benzyl)isocyanurate, 1,3,5-tris(4-tert-butyl-3-hydroxy-2,6-dimethylbenzyl) 1,3,5-triazine-2,4,6-(1H,3H,5H)-trione; 1,1,3-tris(2-methyl-4-hydroxy-5-tert-butylphenyl)butane, 1,3,5-triazine-2,4,6 (1H,3H,5H)-trione, 1,3,5-tris[[3,5-bis-(1,1-dimethylethyl)-4-hydroxyphenyl]methyl], 4,4',4"-[(2,4,6-trimethyl-1,3,5-benzenetriyl)tris-(methylene)]tris[2,6-bis(1,1-dimethylethyl)], stearyl 3,5-di-tert-butyl-4-hydroxyhydocinnamate and mixtures thereof.

11. The composition of claim 1, wherein the phenolic antioxidant is present in the composition from 0.05 wt % to 0.5 wt %.

12. The composition of claim 1, wherein the hindered amine is present in the composition from 0.2 wt % to 0.8 wt %.

13. The composition of claim 1, wherein the ethoxylated amine is present in the composition from 0.2 wt % to 0.8 wt %.

14. The composition of claim 1, wherein the composition further comprises an organic phosphite.

15. The composition of claim 1, wherein the composition further comprises a filler.

16. The composition of claim 1, wherein the polyolefin copolymer is a copolymer of propylene derived units and ethylene derived units.

17. The composition of claim 16, wherein the ethylene is present from 0.5 wt % to 25 wt % of the polyolefin copolymer.

18. The composition of claim 1, wherein the polyolefin homopolymer is a homopolymer of propylene derived units.

19. The composition of claim 1, wherein the polyolefin homopolymer or copolymer is deashed in a single step with water.

20. The composition of claim 1, wherein the evaluation of the composition after 2500 hrs. in a WOM Ci35A at 80° C. is from 4 to 5.

21. An automotive component made from the composition of claim 1.

22. A composition comprising (by weight of the composition):
(a) a polyolefin homopolymer or copolymer;
(b) from 0.001 to 2 wt % hindered amine;
(c) from 0.2 to 2 wt % ethoxylated amine; and
(d) from 0.001 to 2 wt % phenolic antioxidant; wherein the evaluation of the composition after 2500 hrs. in a WOM Ci35A at 80° C. is from 4 to 5.

23. The composition of claim 22, wherein the hindered amine compound is selected from low molecular weight polyalkylpiperidines, high molecular weight polyalkylpiperidines, hindered piperidine compounds, and mixtures thereof.

24. The composition of claim 22, wherein the hindered amine compound is selected from compounds having the following structures:

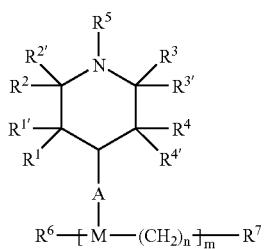

wherein M is silicon, alkoxysilane, nitrogen, or phosphorous; wherein the value of n ranges from 1 to 50, and the value of m ranges from 1 to 400; wherein $R^1$, $R^{2'}$, $R^2$, $R^{2'}$, $R^3$, $R^{3'}$, $R^4$, and $R^{4'}$ are selected independently from hydrogen, $C_1$ to $C_{20}$ alkyls, and $C_3$ to $C_{30}$ branched alkyls; $R^5$ is selected from hydrogen, $C_1$ to $C_{20}$ alkyls, and $C_3$ to $C_{30}$ branched alkyls; and polymeric pyridine derivatives; and $R^6$ and $R^7$ are selected independently from hydrogen, $C_1$ to $C_{20}$ alkyls, and $C_3$ to $C_{30}$ branched alkyls, 1,3,4-triazine and substituted 1,3,4-triazines; and wherein A may directly bond with nitrogen or a group selected from $C_1$ to $C_{20}$ alkyls, $C_1$ to $C_{20}$ alkoxys, and $C_3$ to $C_{30}$ branched alkyls, imidazole and its derivatives.

25. The composition of claim 22, wherein the phenolic antioxidant is selected from structures represented by the following:

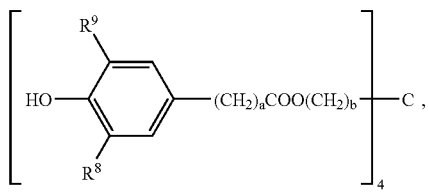

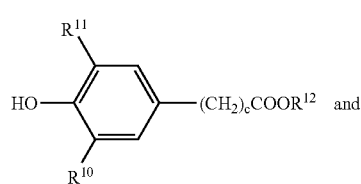

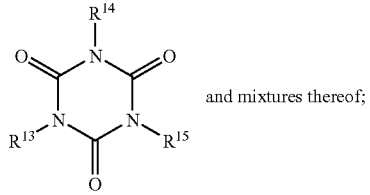

and mixtures thereof;

wherein the values of a, b and c independently range from 1 to 10, and wherein $R^8$, $R^9$, $R^{10}$ $R^{11}$, and $R^{12}$ are independently selected from hydrogen, $C_1$ to $C_{10}$ alkyls and $C_3$ to $C_{30}$ branched alkyls; and wherein $R^{13}$, $R^{14}$ and $R^{15}$ are independently selected from structured represented by the following:

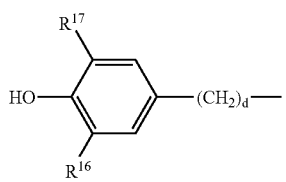

wherein the value of d ranges from 1 to 10, and wherein $R^{16}$ and $R^{17}$ are independently selected from hydrogen $C_1$ to $C_{10}$ alkyls and $C_3$ to $C_{30}$ branched alkyls.

26. The composition of claim 22, wherein the phenolic antioxidant is selected from:

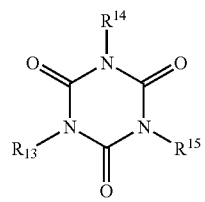

wherein $R^{13}$, $R^{14}$ and $R^{15}$ are independently selected from structured represented by the following:

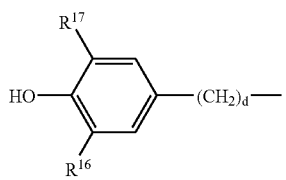

wherein the value of d ranges from 1 to 10, and wherein $R^{16}$ and $R^{17}$ are independently selected from hydrogen $C_1$ to $C_{10}$ alkyls and $C_3$ to $C_{30}$ branched alkyls.

27. The composition of claim 22, wherein the hindered amine is present from 0.02 wt % to 1 wt %.

28. The composition of claim 22, wherein the phenolic antioxidant is present from 0.02 wt % to 0.8 wt %.

29. The composition of claim 22, wherein the ethoxylated amine is present from 0.02 wt % to 0.8 wt %.

30. The composition of claim 22, wherein the hindered amine compound is selected from the following compounds and their derivatives: poly(N-β-hydroxymethyl-2,2,6,6-tetramethyl-4-hydroxy-piperidyl succinate), bis(1,2,2,6,6-pentamethyl-4-piperidyl)sebacate, bis(2,2,6,6-tetramethyl-4-piperidyl)sebacate, poly{[6-(1,1,3,3-tetramethylbutyl)-imine]-1,3,5-triazine-2,4-diol][2-(2,2,6,6-tetramethylpiperidyl)amine]hexamethylene-[4-(2,2,6,6-tetramethylpiperidyl)imine}, polymethylpropyl-3-oxy[4-(2,2,6,6-tetramethyl-piperidinyl]siloxane, tetrakis (1,2,2,6,6-pentamethyl-4-piperidyl) 1,2,3,4-butanetetracarboxylate, 1,6-hexanediamine-N,N'-bis(2,2,6,6-tetramethyl)-4-piperidinyl)-, polymers of 2,4-dichloro-6-(4-morpholinyl)-1,3,5-triazine, N,N'-bis(1,2,2,6,6-pentamethyl-4-piperidinyl)-1,6-hexanediamine, morpholine-2,4,6-trichloro-1,3,5-triazine, esters of 2,2,6,6-tetramethyl-4-piperidinol and mixtures thereof.

31. The composition of claim 22, wherein the phenolic antioxidant compound is selected from the following compounds and their derivatives: wherein the phenolic antioxidant is selected from the following compounds and their derivatives: 2,6-di-tert-butyl-4-methylphenol; 2,4-di-tert-butyl-phenol, pentaerythrityl tetrakis(3,5-di-tert-butyl-4-hydroxyphenyl) propionate, octadecyl-3-(3',5'-di-tert-butyl-4'-hydroxyphenyl)propionate, tetrakis[methylene(3,5-di-tert-butyl-4-hydroxycinnamate)]methane; bis-2,2'-methylene-bis(6-tert-butyl-4-methylphenol)terephthalate; 1,3,5-trimethyl-2,4,6-tris(3,5-di-tert-butyl-4-hydroxybenzyl) benzene; tris(3,5-di-tert-butyl-4-hydroxybenzyl) isocyanurate; tris(3,5-di-tert-butyl-4-hydroxybenzyl) isocyanurate, tris(4-tert-butyl-3-hydroxy-2,6-dimethyl benzyl)isocyanurate, 1,3,5-tris(4-tert-butyl-3-hydroxy-2,6-dimethylbenzyl)1,3,5-triazine-2,4,6-(1H,3H,5H)-trione; 1,1,3-tris(2-methyl-4-hydroxy-5-tert-butylphenyl)butane, 1,3,5-triazine-2,4,6(1H,3H,5H)-trione, 1,3,5-tris[[3,5-bis-(1,1-dimethylethyl)-4- hydroxyphenyl]methyl], 4,4',4"-[(2,4,6-trimethyl-1,3,5-benzenetriyl)tris-(methylene)]tris[2,6-bis(1,1-dimethylethyl)], stearyl 3,5-di-tert-butyl-4-hydroxyhydocinnamate and mixtures thereof.

32. The composition of claim 22, wherein the one or more phenolic antioxidants is present in the composition from 0.05 wt % to 0.5 wt %.

33. The composition of claim 22, wherein the one or more hindered amines is present in the composition from 0.2 wt % to 0.8 wt %.

34. The composition of claim 22, wherein the ethoxylated amine is present in the composition from 0.3 wt % to 0.8 wt %.

35. The composition of claim 22, wherein the composition further comprises an organic phosphite.

36. The composition of claim 22, wherein the composition further comprises a filler.

37. The composition of claim 22, wherein the polyolefin copolymer is a copolymer of propylene derived units and ethylene derived units.

38. The composition of claim 37, wherein the ethylene is present from 0.5 wt % to 25 wt % of the polyolefin copolymer.

39. The composition of claim 22, wherein the polyolefin homopolymer is a homopolymer of propylene derived units.

40. The composition of claim 22, wherein the polyolefin copolymer or homopolymer is deashed in a single step with water.

41. An automotive component made from the composition of claim 22.

* * * * *